United States Patent
Kurozuka et al.

(10) Patent No.: US 7,872,395 B2
(45) Date of Patent: Jan. 18, 2011

(54) ACTUATOR WITH SYMMETRIC POSITIONING

(75) Inventors: Akira Kurozuka, Osaka (JP); Hiroshi Obi, Nara (JP)

(73) Assignee: Panasonic Corporation, Osaka (JP)

( * ) Notice: Subject to any disclaimer, the term of this patent is extended or adjusted under 35 U.S.C. 154(b) by 264 days.

(21) Appl. No.: 12/067,201

(22) PCT Filed: Sep. 19, 2006

(86) PCT No.: PCT/JP2006/318502

§ 371 (c)(1),
(2), (4) Date: Mar. 18, 2008

(87) PCT Pub. No.: WO2007/034777

PCT Pub. Date: Mar. 29, 2007

(65) Prior Publication Data
US 2009/0180168 A1     Jul. 16, 2009

(30) Foreign Application Priority Data
Sep. 21, 2005  (JP) .............................. 2005-273320

(51) Int. Cl.
  *G02B 26/08*  (2006.01)
  *H02N 1/00*   (2006.01)
(52) U.S. Cl. .................. 310/309; 359/224.1; 359/225.1
(58) Field of Classification Search ................. 310/309; 359/224.1, 224.2, 225.1, 226.1, 226.2
See application file for complete search history.

(56) References Cited

U.S. PATENT DOCUMENTS

| | | | |
|---|---|---|---|
| 4,598,585 A * | 7/1986 | Boxenhorn .............. | 73/504.12 |
| 5,959,760 A | 9/1999 | Yamada et al. | |
| 6,075,639 A * | 6/2000 | Kino et al. ............... | 359/224.1 |
| 6,445,484 B1 * | 9/2002 | Miyajima et al. ........ | 359/224.1 |
| 6,879,428 B2 * | 4/2005 | Massieu .................... | 359/290 |

(Continued)

FOREIGN PATENT DOCUMENTS

JP     11-52278      2/1999

(Continued)

OTHER PUBLICATIONS

Sunghoon Kwon et al., "Micromirrrors with Large Static Rotation by Backside Island Isolation", IEEE Journal of Selected Topics in Quantum Electronics, vol. 10, No. 3, May/Jun. 2004.*

(Continued)

*Primary Examiner*—Karl I Tamai
(74) *Attorney, Agent, or Firm*—Renner, Otto, Boisselle & Sklar, LLP

(57) ABSTRACT

An actuator 1 according to the present invention includes: a first movable section 5; a second movable section 6 supporting the first movable section 5; and a stationary section 13 supporting the second movable section 6. The second movable section 6 includes: a first conductive portion 6a for applying a first voltage to the first movable section 5; a second conductive portion 6b to which a second voltage is applied; and backlining 15 for stabilizing the first conductive portion 6a and the second conductive portion 6b to each other in an electrically insulated state. The backlining 15 stabilizes the first conductive portion 6a and the second conductive portion 6b from a face of the actuator 1 opposite from the face on which the mirror section 34 is provided.

6 Claims, 10 Drawing Sheets

U.S. PATENT DOCUMENTS

| | | | |
|---|---|---|---|
| 2003/0227700 A1 | 12/2003 | Mizuno et al. | |
| 2005/0088720 A1 | 4/2005 | Ko et al. | |
| 2006/0185433 A1* | 8/2006 | Leonardson et al. | 73/514.32 |
| 2009/0180168 A1* | 7/2009 | Kurozuka et al. | 359/221.2 |
| 2010/0067078 A1* | 3/2010 | Obi et al. | 359/200.6 |

FOREIGN PATENT DOCUMENTS

| | | |
|---|---|---|
| JP | 2004-013099 | 1/2004 |
| JP | 2004-239987 | 8/2004 |
| JP | 2005-128551 | 5/2005 |

OTHER PUBLICATIONS

Jongbaeg Kim et al., "Monolithic 2-D Scanning Mirror Using Self-Aligned Angular Vertical Comb Drives", IEEE Photonics Technology Letters, vol. 17, No. 11, Nov. 2005.*

International Search Report for corresponding Application No. PCT/JP2006/318502 dated Oct. 31, 2006.

Harald Schenk et al.; "An Electrostatically Excited 2D-Micro-Scanning-Mirror with an In-Plane Configuration of the Driving Electrodes"; 13th Annual International Conference on Micro Electro Mechanical Systems 2000; Jan. 23-27, 2000; pp. 473-478 (cited in [0004], p. 2 of the description).

Harald Schenk et al.; "A Resonantly Excited 2D-Micro-Scanning-Mirror with Large Deflection"; Sensors and Actuators A 89; 2001; pp. 104-111.

* cited by examiner

B-B CROSS SECTION

C-C CROSS SECTION

US 7,872,395 B2

ACTUATOR WITH SYMMETRIC POSITIONING

TECHNICAL FIELD

The present invention relates to an actuator, and in particular to a bi-axial pivoting type resonant mirror device. A resonant mirror device of the present invention, to which micromachining technology is applied, may be used for e.g. optical scanning apparatuses for use in laser printers and the like, reading apparatuses such as bar-code readers, laser projectors, and so on.

BACKGROUND ART

In an oscillating mirror device which is formed by micromachining technology, a mirror section is supported by two hinges which are provided along the same line, for example. An electrode is provided at a position opposing the mirror section. Due to an electrostatic attraction occurring between the mirror section and the electrode, the mirror section undergoes reciprocating oscillation, with the two hinges acting as twist pivot axes.

As compared to a mirror device in which a polygon mirror is rotated by a motor, such an oscillating mirror device has a simple structure and permits batch processing in a semiconductor process, and thus is easy to be downsized and has a low production cost. Moreover, an oscillating mirror device has a single reflection surface, and therefore suffers no fluctuations in accuracy like those of a polygon mirror having a plurality of faces. Moreover, the operation of an oscillating mirror device is a reciprocating oscillation, which can be made rapid.

Patent Document 1 discloses a mono-axial pivoting type mirror device, and Non-patent Document 1 discloses a bi-axial pivoting type mirror device.

A movable section of a mono-axial pivoting type mirror device is a mirror section that is supported by hinges. The mirror section is isolated from a stationary section by isolation trenches, and the mirror section is driven by an electrostatic attraction which occurs when a driving voltage is applied to the mirror section.

In a bi-axial pivoting type mirror device, an intermediate frame supports a mirror section via hinges, and a stationary section supports the intermediate frame via further hinges, such that the mirror section and the intermediate frame portion constitute a movable section.

With reference to FIG. 10, a bi-axial pivoting type mirror device will be described. FIG. 10 is a perspective view showing a bi-axial pivoting type resonant mirror device 51.

The resonant mirror device 51 includes a first movable section 55 having a mirror face, a second movable section 56 supporting the first movable section 55, and a stationary section 63 supporting the second movable section 56.

The resonant mirror device 51 further includes X hinges 57 and Y hinges 58. The second movable section 56 links to and supports the first movable section 55 via the Y hinges 58. The first movable section 55 is capable of pivoting relative to the second movable section 56 around the Y hinges 58, where the pivot axis is an axis which passes through the Y hinges 58 extending along the Y direction in FIG. 10. The stationary section 63 links to and supports the second movable section 56 via the X hinges 57. The second movable section 56 is capable of pivoting relative to the stationary section 63 around the X hinges 57, where the pivot axis is an axis which passes through the X hinges 57 extending along the X direction in FIG. 10.

At its outer periphery, the first movable section 55 includes X electrode combteeth 59a which generate a driving force for causing a relative displacement of the first movable section 55 with respect to the second movable section 56. At its outer periphery, the second movable section 56 includes Y electrode combteeth 61a which generate a driving force for causing a relative displacement of the second movable section 56 with respect to the stationary section 63.

Moreover, at the inner periphery of the second movable section 56, X electrode combteeth 59b are formed which oppose the X electrode combteeth 59a so as to mesh therewith via a gap. At the inner periphery of the stationary section 63, Y electrode combteeth 61b are formed which oppose the Y electrode combteeth 61a so as to mesh therewith via a gap.

As described above, the first movable section 55 is supported so as to be capable of pivoting relative to the second movable section 56 around the Y hinges 58, and the second movable section 56 is supported so as to be capable of pivoting relative to the stationary section 63 around the X hinges 57, thus realizing the bi-axial pivoting type resonant mirror device 51.

The second movable section 56 includes a first conductive portion 56a for applying a voltage to the first movable section 55, and a second conductive portion 56b to which a different voltage is applied. Because of isolation trenches 64 which are formed between the first conductive portion 56a and the second conductive portion 56b, the first conductive portion 56a and the second conductive portion 56b are split, and are electrically insulated from each other. This makes it possible to independently apply a driving voltage to each of the first movable section 55 and the second movable section 56.

FIG. 11 is a diagram showing a cross section of the resonant mirror device 51. This cross-sectional view corresponds to a D-D cross section in FIG. 10. Referring to FIG. 11, polysilicon is embedded after depositing an insulating layer in the isolation trenches 64, whereby the first conductive portion 56a and the second conductive portion 56b are bonded together in such a manner that the first conductive portion 56a and the second conductive portion 56b will not come apart. As a result, the first conductive portion 56a and the second conductive portion 56b will integrally make a displacement as the second movable section 56.

FIG. 12 is a plan view showing an electrical isolation scheme in the resonant mirror device 51. A voltage Vx applied to an X pad 70 serves as a voltage of the first movable section 55. Assuming that the ground pad 72 is at the ground level (GND), a potential difference of Vx occurs between the first movable section 55 and the second movable section 56.

On the other hand, a voltage Vy which is applied to a Y pad 71 serves as a voltage of the stationary section 63, such that a potential difference of Vy occurs between the stationary section 63 and the second movable section 56.

When Vx and Vy are appropriately controlled, the first movable section 55 and the second movable section 56 will undergo resonation operations at their respective resonant frequencies. As a result, in the bi-axial pivoting type resonant mirror device 51, the pivoting around the X axis and the pivoting around the Y axis of the first movable section 55 can be independently driven under control.

[Patent Document 1] Japanese Laid-Open Patent Publication No. 2004-239987

[Non-patent Document 1] "AN ELECTROSTATICALLY EXCITED 2D-MICRO-SCANNING-MIRROR WITH AN IN-PLANE CONFIGURATION OF THE DRIVING ELECTRODES" (MEMS2000.Proceedings Piscataway, N.J.: IEEE, 2000)

DISCLOSURE OF INVENTION

Problems to be Solved by the Invention

However, the above-described mirror devices have the following problems.

In a mono-axial pivoting type mirror device, bi-axial pivoting is impossible, and its operation is limited to mono-axial pivoting.

In the bi-axial pivoting type mirror device 51 shown in FIG. 10 to FIG. 12, the step of embedding something in the isolation trenches 64 is time-consuming and leads to an increase in cost.

Moreover, as the isolation trenches 64 become deeper, it becomes more difficult to achieve sure embedding. If embedding is incomplete, there is a possibility that the embedded portion may be damaged through oscillation, such that the first conductive portion 56a and the second conductive portion 56b may come apart.

Furthermore, if the deposition of an insulating layer in the isolation trenches 64 is insufficient, there is a possibility that the electrical insulation between the first conductive portion 56a and the second conductive portion 56b may be imperfect.

The present invention has been made in view of the aforementioned problems, and an objective thereof is to provide a bi-axial pivoting type resonant mirror device which can be easily formed through a simple production process and which has a high reliability.

Means for Solving the Problems

An actuator according to the present invention is characterized that it comprises: a first movable section; a second movable section supporting the first movable section; and a stationary section supporting the second movable section, wherein the second movable section includes: a first conductive portion for applying a first voltage to the first movable section; a second conductive portion to which a second voltage is applied; and backlining for stabilizing the first conductive portion and the second conductive portion to each other in an electrically insulated state.

In one embodiment, the first movable section includes a mirror section for reflecting light; and the backlining stabilizes the first conductive portion and the second conductive portion from a face of the actuator opposite from a face on which the mirror section is provided.

In one embodiment, the first conductive portion and the second conductive portion are electrically insulated from each other by a trench which is formed between the first conductive portion and the second conductive portion of the second movable section.

In one embodiment, a dummy trench is formed in a point symmetric position from the trench in the second movable section.

In one embodiment, the first and second movable sections are formed by, in an SOI wafer in which first and second silicon layers are bonded via an insulating layer, etching the first silicon layer; and the backlining is formed by etching the second silicon layer.

In one embodiment, the first movable section includes first and second electrode combteeth for generating a driving force for causing a relative displacement of the first movable section with respect to the second movable section; the first electrode combteeth extend in a direction which is perpendicular to a pivot axis of the first movable section; the second electrode combteeth extend in a direction which is parallel to the pivot axis of the first movable section; the second movable section includes third and fourth electrode combteeth for generating a driving force for causing a relative displacement of the second movable section with respect to the stationary section; the third electrode combteeth extend in a direction which is perpendicular to a pivot axis of the second movable section; and the fourth electrode combteeth extend in a direction which is parallel to the pivot axis of the second movable section.

A production method for the actuator according to the present invention is characterized by comprising: a step of forming the first and second movable sections by, in an SOI wafer in which first and second silicon layers are bonded via an insulating layer, etching the first silicon layer; and a step of forming the backlining by etching the second silicon layer.

In one embodiment, the step of forming the backlining includes: a step of forming a resist pattern that masks a position on the second silicon layer at which to form the backlining; a step of etching the second silicon layer to a depth corresponding to a thickness of the second silicon layer to be left as the backlining; a step of removing the resist pattern, and etching the second silicon layer until the insulating layer is exposed in any position other than the position at which to form the backlining; and a step of removing any exposed portion of the insulating layer.

Effects of the Invention

According to the present invention, backlining allows a first conductive portion and a second conductive portion of a second movable section to be stabilized in an electrically insulated state. As a result, the first conductive portion and the second conductive portion can be surely stabilized. Moreover, since it is unnecessary to embed something in any trench between the first conductive portion and the second conductive portion, the production steps of the actuator can be simplified and an inexpensive actuator can be provided.

Moreover, in one embodiment, the actuator includes a mirror section so that a bi-axial pivoting type resonant mirror device is obtained.

Moreover, in one embodiment, a dummy trench is formed at a point symmetric position from a trench between the first conductive portion and the second conductive portion of the second movable section, whereby a weight imbalance of the second movable section can be minimized.

Moreover, in one embodiment, the first movable section includes electrode combteeth extending in a direction which is parallel to the pivot axis of the first movable section, and the second movable section includes electrode combteeth extending in a direction which is parallel to the pivot axis of the second movable section. As a result, the first and second movable sections can be driven to greater pivot angles.

Figure 1:
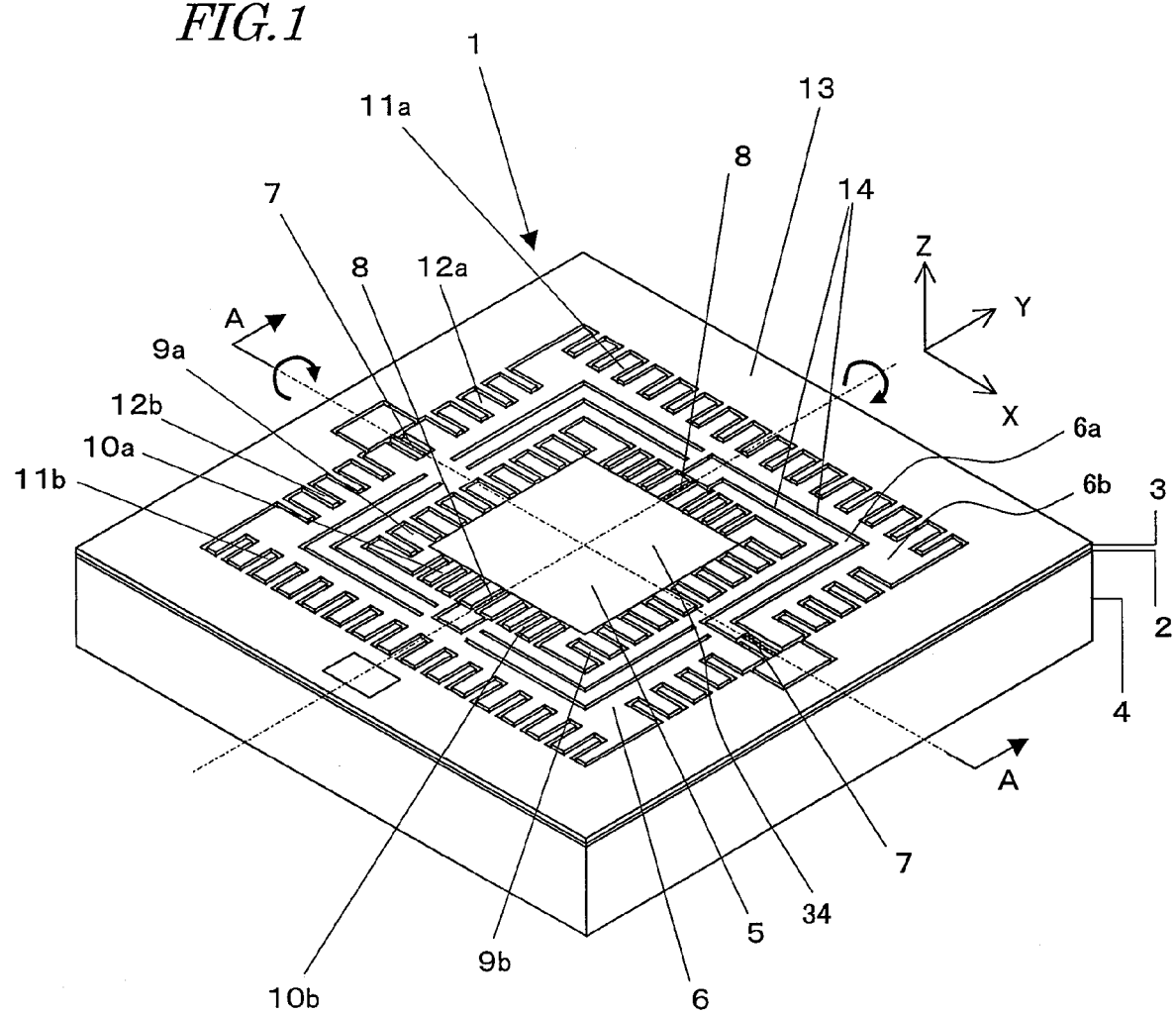
[FIG. 1] A perspective view showing a resonant mirror device according to an embodiment of the present invention.

DESCRIPTION OF THE REFERENCE NUMERALS 1 resonant mirror device
2 insulating layer
3 device layer
4 handle layer
5 first movable section
6 second movable section
7 X hinges
8 Y hinges
9 X electrode combtooth
10 X auxiliary electrode combtooth
11 Y electrode combtooth
12 Y auxiliary electrode combtooth
13 stationary section
14 isolation trench
15 backlining
20 X pad
21 Y pad
22 ground pad
23 dummy trench
30 SOI wafer
31 resist pattern
32 oxide film pattern
33 resist pattern
34 reflection film

BEST MODE FOR CARRYING OUT THE INVENTION

Hereinafter, with reference to the drawings, an embodiment of the present invention will be described.

First, with reference to FIG. 1, an actuator according to the present embodiment will be described. FIG. 1 is a perspective view showing a resonant mirror device 1, which is an actuator of the present embodiment.

The resonant mirror device 1 is produced by processing a wafer in which two silicon layers are bonded via an insulating layer 2 of silicon oxide ($SiO_2$), i.e., a so-called SOI (Silicon On Insulator) wafer, for example.

Among the two silicon layers, a first silicon layer is doped with an n type impurity such as phosphorus (P) or arsenic (As) or a p type impurity such as boron (B) so that an electrical conductivity is conferred thereto, and thus is referred to as a device layer 3. A second silicon layer is a thick portion that constitutes a main portion of the wafer, and is referred to as a handle layer 4.

By subjecting the device layer 3 to an etching-based patterning described below, a first movable section 5 and a second movable section 6 are formed.

The resonant mirror device 1 includes: a first movable section 5 having a mirror face 34; a second movable section 6 supporting the first movable section 5; and a stationary section 13 supporting the second movable section 6.

The resonant mirror device 1 further includes X hinges 7 and Y hinges 8. The second movable section 6 links to and supports the first movable section 5 via the Y hinges 8. The first movable section 5 is capable of pivoting relative to the second movable section 6 around the Y hinges 8, where the pivot axis is an axis which passes through the Y hinges 8 extending along the Y direction in FIG. 1. The stationary section 13 links to and supports the second movable section 6 via the X hinges 7. The second movable section 6 is capable of pivoting relative to the stationary section 13 around the X hinges 7, where the pivot axis is an axis which passes through the X hinges 7 extending along the X direction in FIG. 1. The resonant mirror device 1 has a gimbal structure as such. The second movable section 6 is an intermediate frame that is positioned between the stationary section 13, which is an outer frame portion, and the first movable section 5, which is a central portion.

At its outer periphery, the first movable section 5 includes X electrode combteeth 9a and X auxiliary electrode combteeth 10a which generate a driving force for causing a relative displacement of the first movable section 5 with respect to the second movable section 6. The X electrode combteeth 9a extend along a direction which is perpendicular to the pivot axis of the first movable section 5. The X auxiliary electrode combteeth 10a extend along a direction which is parallel to the pivot axis of the first movable section 5. The X auxiliary electrode combteeth 10a are formed along edges of the first movable section 5 to which the Y hinges 8 are connected, whereas the X electrode combteeth 9a are formed along edges to which the Y hinges 8 of the first movable section 5 are not connected. Since the X auxiliary electrode combteeth 10a are formed so as to be parallel to the Y hinges 8 and have a similar length thereto, no increase in chip size occurs due to the X auxiliary electrode combteeth 10a.

At its outer periphery, the second movable section 6 includes Y electrode combteeth 11a and Y auxiliary electrode combteeth 12a which generate a driving force for causing a relative displacement of the second movable section 6 with respect to the stationary section 13. The Y electrode combteeth 11a extend along a direction which is perpendicular to the pivot axis of the second movable section 6. The Y auxiliary electrode combteeth 12a extend along a direction which is parallel to the pivot axis of the second movable section 6. The Y auxiliary electrode combteeth 12a are formed along edges of the second movable section 6 to which the X hinges 7 are connected, whereas the Y electrode combteeth 11a are formed along edges to which the X hinges 7 of the second movable section 6 are not connected. Since the Y auxiliary electrode combteeth 12a are formed so as to be parallel to the X hinges 7 and have a similar length thereto, no increase in chip size occurs due to the Y auxiliary electrode combteeth 12a.

Moreover, at the inner periphery of the second movable section 6, X electrode combteeth 9b are formed which oppose the X electrode combteeth 9a so as to mesh therewith via a gap, and X auxiliary electrode combteeth 10b are formed which oppose the X auxiliary electrode combteeth 10a so as to mesh therewith via a gap. At the inner periphery of the stationary section 13, Y electrode combteeth 11b are formed which oppose the Y electrode combteeth 11a so as to mesh therewith via a gap, and Y auxiliary electrode combteeth 12b are formed which oppose the Y auxiliary electrode combteeth 12a so as to mesh therewith via a gap. The effects of the auxiliary electrode combteeth will be described later.

As described above, the first movable section 5 is supported so as to be capable of pivoting relative to the second movable section 6 around the Y hinges 8, and the second movable section 6 is supported so as to be capable of pivoting relative to the stationary section 13 around the X hinges 7, thus realizing the bi-axial pivoting type resonant mirror device 1.

When a potential difference occurs between the first movable section 5 and the second movable section 6, the first movable section 5 makes a relative displacement with respect to the second movable section 6. FIG. 6F is a diagram corresponding to an A-A cross section of the resonant mirror device 1 shown in FIG. 1. Referring to FIG. 1 and FIG. 6F, the second movable section 6 includes a first conductive portion 6a for applying a first voltage to the first movable section 5 and a second conductive portion 6b to which a second voltage is applied. Because of isolation trenches 14 which are formed between the first conductive portion 6a and the second conductive portion 6b, the first conductive portion 6a and the second conductive portion 6b are split, and are electrically insulated from each other. This makes it possible to independently apply a driving voltage to each of the first movable section 5 and the second movable section 6.

Figure 2:
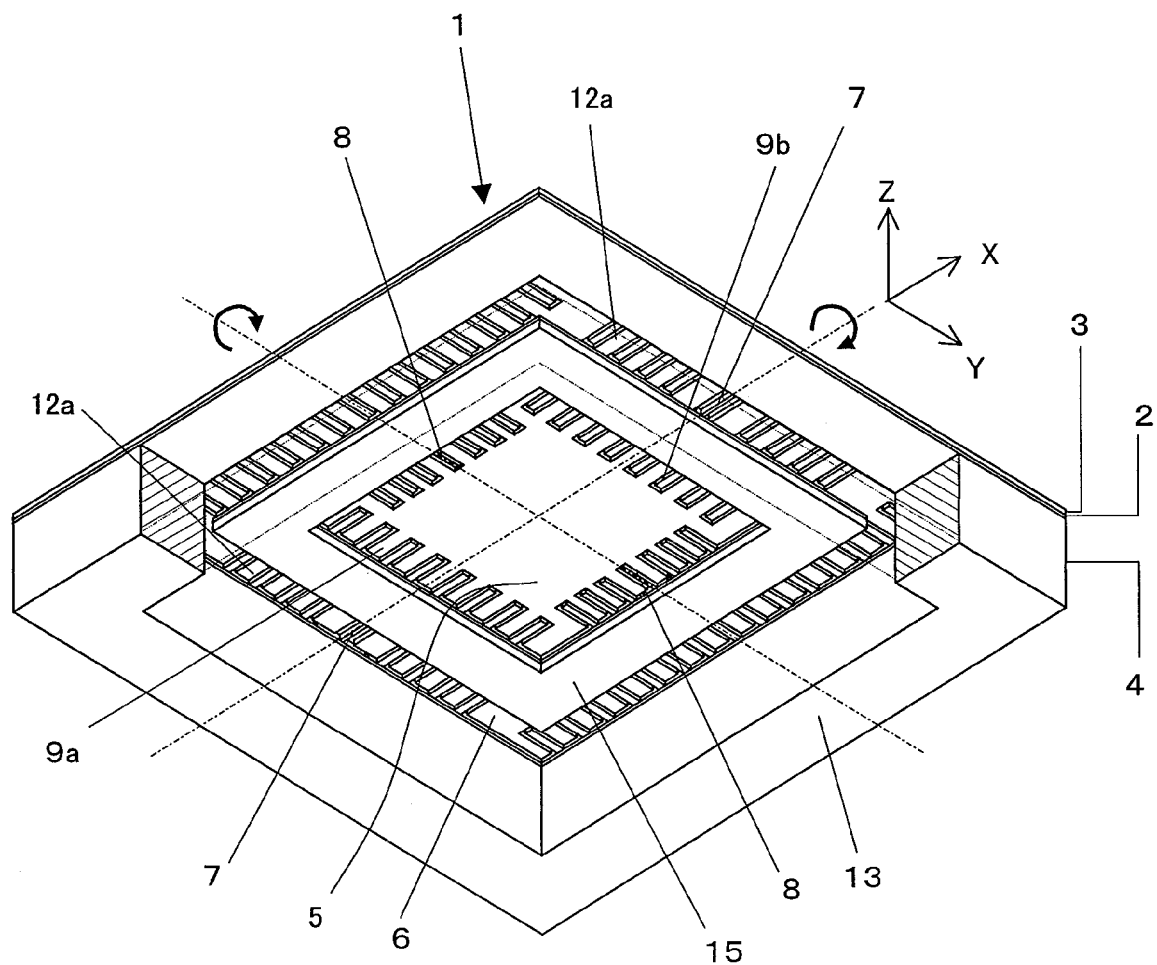
[FIG. 2] A lower perspective view showing a resonant mirror device according to an embodiment of the present invention.

FIG. 2 is a lower perspective view showing the resonant mirror device 1 of the present invention. The upper side in FIG. 2 corresponds to the fore side of the resonant mirror device 1 as shown in the perspective view, whereas the lower side in FIG. 2 corresponds to the rear side of the resonant mirror device 1 as shown in the perspective view, and a portion of the handle layer 4 of the stationary section 13 is cut away for illustration. The resonant mirror device 1 further includes backlining 15 for stabilizing the first conductive portion 6a and the second conductive portion 6b (FIG. 1) to each other in an electrically insulated state. The backlining 15 stabilizes the first conductive portion 6a and the second conductive portion 6b from a face (i.e., a lower face) that is opposite to the face (upper face) on which the mirror face 34 of the resonant mirror device 1 is provided.

With reference to FIG. 2, the handle layer 4 is removed from under the first and second movable sections 5 and 6, so that the first and second movable sections 5 and 6 become capable of pivoting. Under the second movable section 6, the handle layer 4 is partially left as the backlining 15. This remaining handle layer 4 and the insulating layer 2 in the same position constitute the backlining 15. The backlining 15 is formed with a thickness which is thinner than the thickness of the stationary section 13, thus allowing the second movable section 6 to have a light weight.

Figure 3:
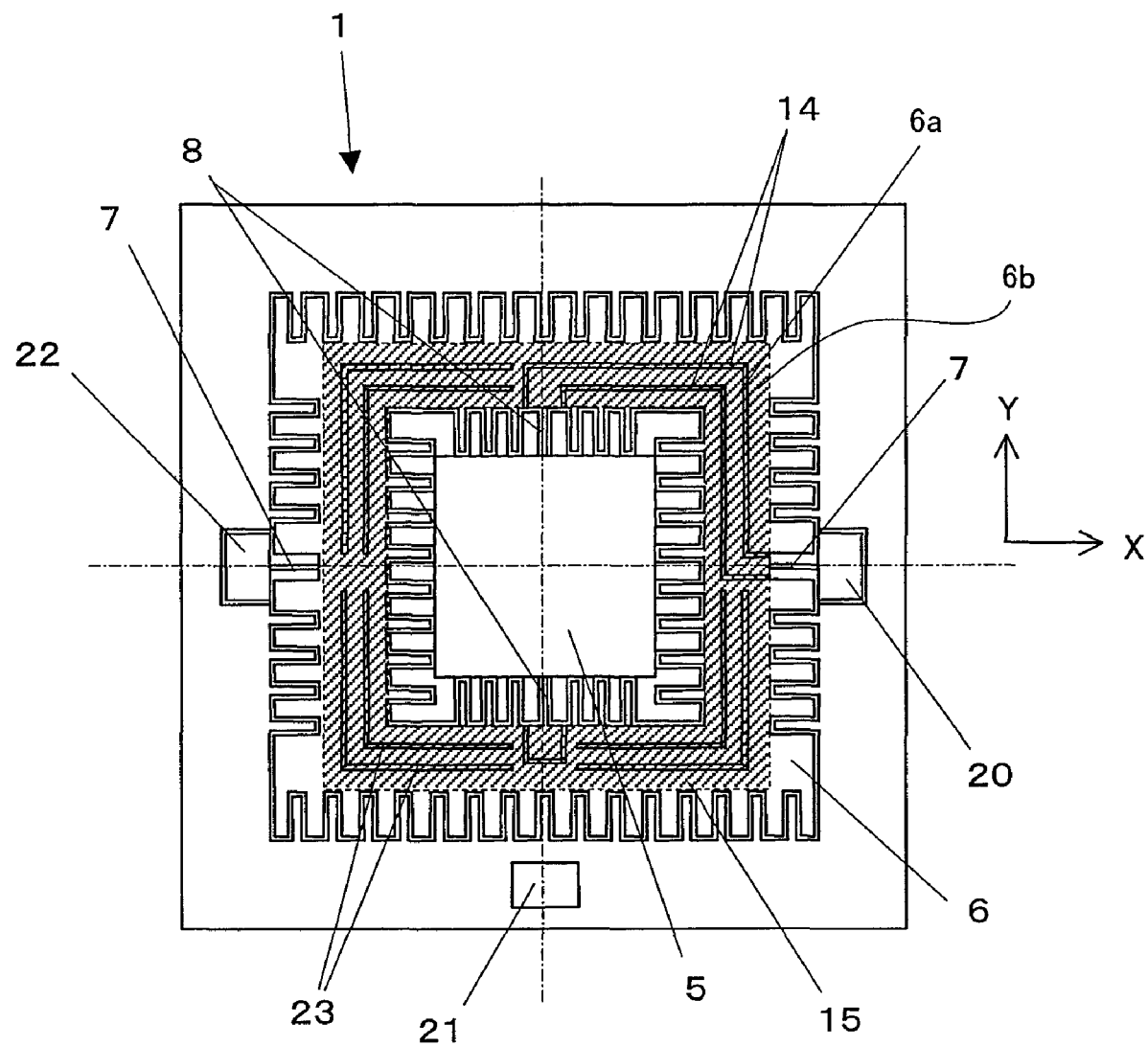
[FIG. 3] A plan view showing a resonant mirror device according to an embodiment of the present invention.

FIG. 3 is a plan view showing positioning of the backlining 15 in the resonant mirror device 1.

A hatched portion shown in FIG. 3 is the backlining 15, and the isolation trenches 14 is formed in this region where the backlining 15 is present. Therefore, even when the first conductive portion 6a and the second conductive portion 6b are isolated by the isolation trenches 14, the first conductive portion 6a and the second conductive portion 6b will integrally make a displacement. Unlike in the conventional example, it is unnecessary to employ a step of embedding another material in the isolation trenches 14 for binding.

Moreover, the insulating layer 2, the device layer 3, and the handle layer 4 are of a wafer structure which is strongly bonded together in advance. Therefore, there is a sufficiently reliable binding strength between the second movable section 6, which is formed of the device layer 3, and the backlining 15, which is formed of the insulating layer 2 and the handle layer 4.

There is also no need to employ an embedding step for insulation. Thus, there is no fear of the electrical insulation between the first conductive portion 6a and the second conductive portion 6b becoming imperfect.

The isolation trenches 14 forming the first conductive portion 6a, which is a connecting portion connecting an X pad 20 to the first movable section 5, are at an unbalanced position with respect to the pivot axes. Left as it is, this would result in a weight imbalance of the second movable section 6, possibly inducing unwanted resonations upon resonance driving, e.g., up and down movements of the second movable section 6. Therefore, with respect to the center of the second movable section 6, dummy trenches 23 are formed at point symmetric positions from the isolation trenches 14 on the second movable section 6. Moreover, dummy trenches 23 are formed at axisymmetric positions with respect to the X pivot axis, and axisymmetric positions with respect to the Y pivot axis, from the isolation trenches 14 on the second movable section 6. By forming the dummy trenches 23 at symmetric positions from the isolation trenches 14, shift in the weight balance can be minimized.

Figure 4:
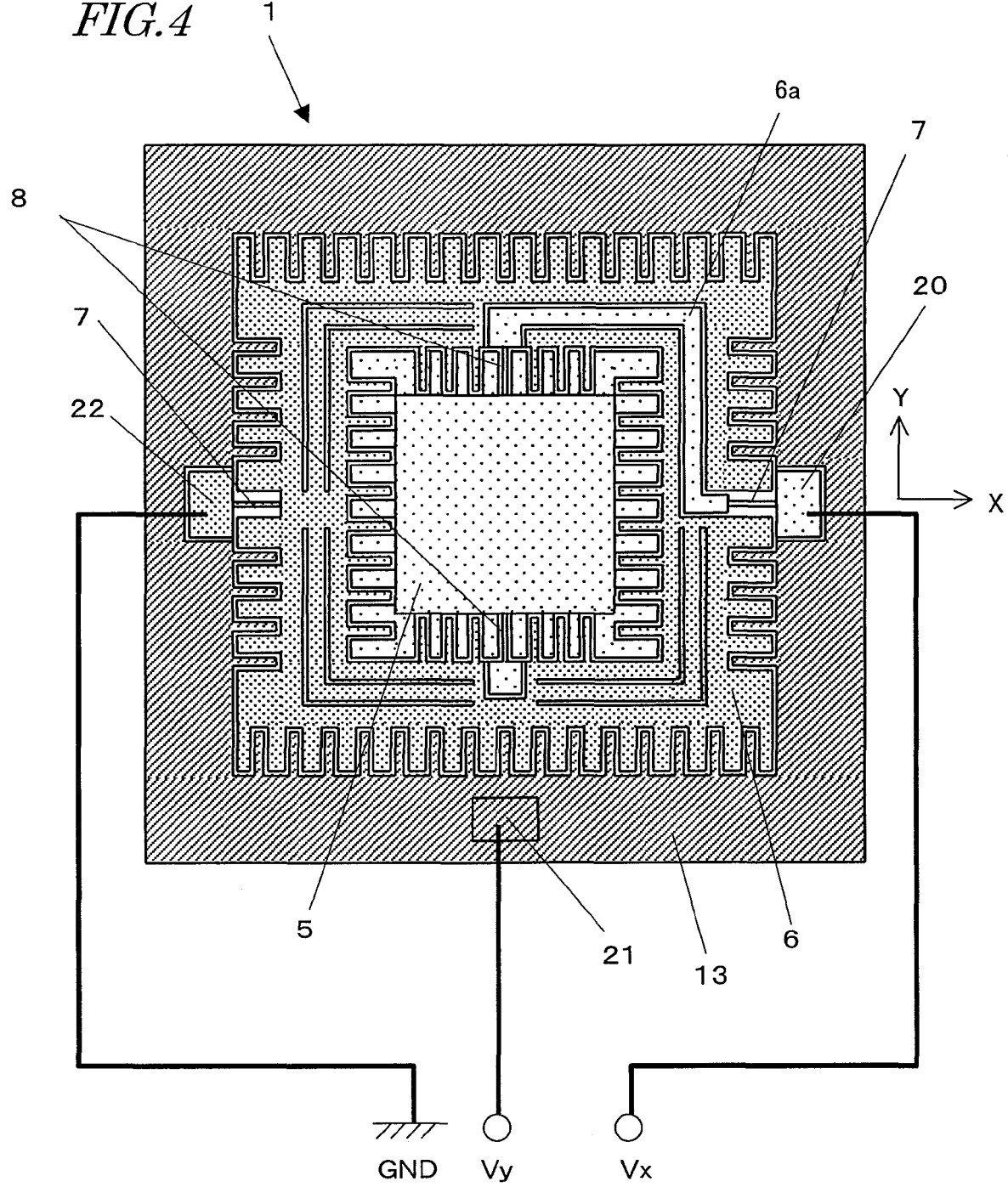
[FIG. 4] A plan view showing an electrical isolation scheme in a resonant mirror device according to an embodiment of the present invention.

FIG. 4 is a plan view showing an electrical isolation scheme in the resonant mirror device 1.

In FIG. 4, as described earlier, the second movable section 6 has isolation trenches 14 formed therein, thus being electrically split into two regions.

One region is a region which begins at the X pad 20, goes through an X hinge 7, the first conductive portion 6a, and a Y hinge 8, and leads into the first movable section 5. The other region is a region which begins at a ground pad 22, goes through an X hinge 7, and leads into the second movable section 6.

With such a construction, a voltage Vx applied to the X pad 20 serves as a voltage of the first movable section 5, and assuming that the ground pad 22 is at the ground level (GND), a potential difference of Vx occurs between the first movable section 5 and the second movable section 6.

On the other hand, a voltage Vy applied to the Y pad 21 serves as a voltage of the stationary section 13, such that a potential difference of Vy occurs between the stationary section 13 and the second movable section 6.

When Vx and Vy are appropriately controlled, the first movable section 5 and the second movable section 6 will undergo resonation operations at their respective resonant frequencies. As a result, in the bi-axial pivoting type resonant mirror device 1, the pivoting around the X axis and pivoting around the Y axis of the first movable section 5 can be independently driven under control.

Figure 5:
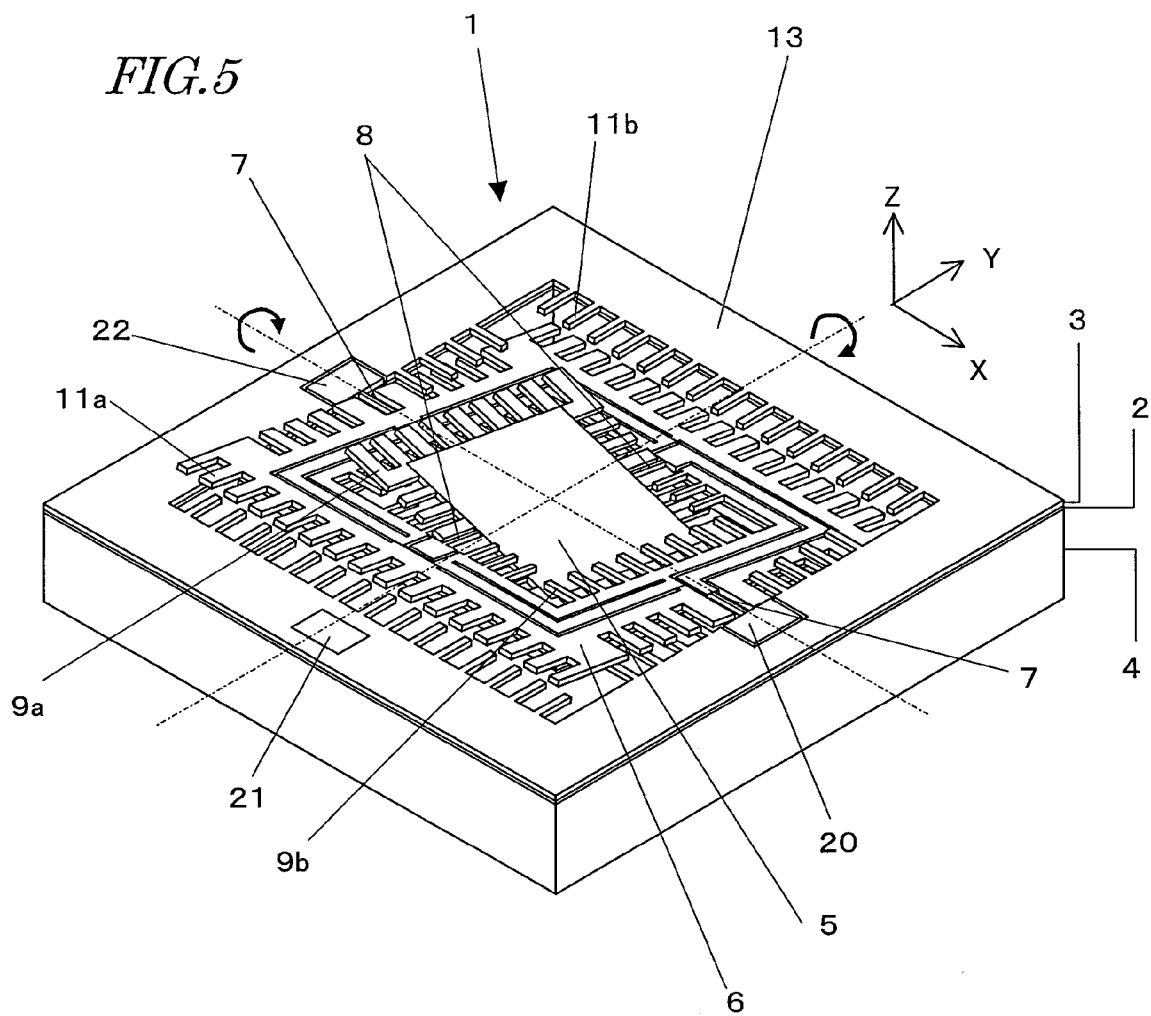
[FIG. 5] A perspective view showing an operation of a resonant mirror device according to an embodiment of the present invention.

FIG. 5 is a perspective view showing an operating state of the resonant mirror device 1.

The first movable section 5 pivots relative to the second movable section 6 around the Y hinges 8. Together with the first movable section 5, the second movable section 6 pivots relative to the stationary section 13 around the X hinges 7. As a result, a laser beam which is reflected from the first movable section 5 attains a two-dimensional scanning along the X-Y directions.

Next, a production method for the resonant mirror device 1 will be described.

FIG. 6A to FIG. 6F are cross-sectional views showing production steps for the resonant mirror device 1.

These cross-sectional views correspond to the A-A cross section in FIG. 1.

Figure 6A:
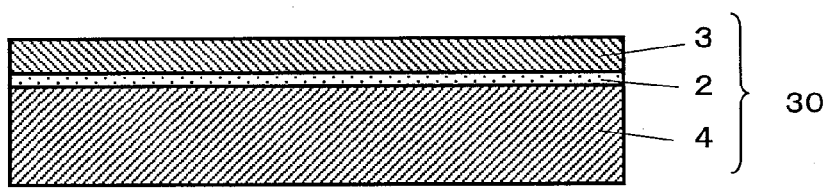
[FIG. 6A] A cross-sectional view showing a production step of a resonant mirror device according to an embodiment of the present invention.

With reference to FIG. 6A, an SOI wafer 30 is provided. The thickness of the device layer 3, which defines the thickness of the first and second movable sections 5 and 6, is determined by taking into consideration the resonant frequencies, oscillation amplitudes responsive to a driving voltage, rigidities, etc. of the movable sections. Herein, it is assumed that there is a device layer of 50 µm, an insulating layer of 2 µm, and a handle layer of 500 µm.

The device layer 3 is doped with an n type impurity such as P or As or a p type impurity such as B, so that an electrical conductivity is conferred thereto.

Figure 6B:
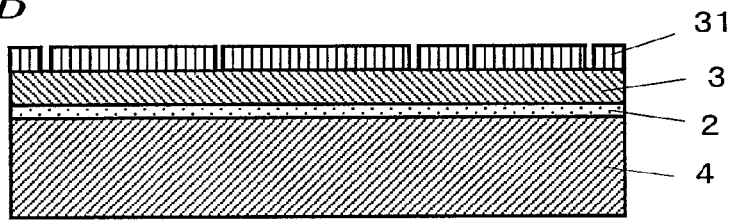
[FIG. 6B] A cross-sectional view showing a production step of a resonant mirror device according to an embodiment of the present invention.

Next, with reference to FIG. 6B, by spin coating, a photoresist in liquid form is formed into a film on the surface of the device layer 3, and, through exposure and development, a resist pattern 31 is formed. As the photoresist, AZP4210 or AZ1500 (manufactured by Clariant (Japan) K.K.) may be used, for example. Any later resist pattern is also formed through such photoresist film formation followed by exposure and development.

Figure 6C:
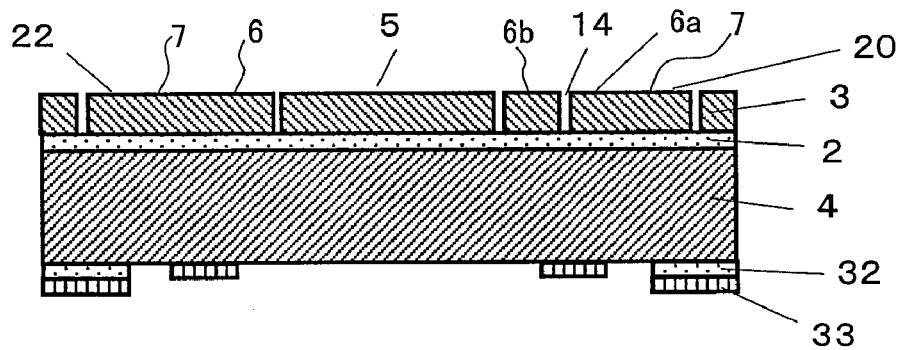
[FIG. 6C] A cross-sectional view showing a production step of a resonant mirror device according to an embodiment of the present invention.

Next, with reference to FIG. 6C, the silicon of the device layer 3 is through-etched via Deep-RIE(Deep Reactive Ion Etching), by using the resist pattern 31 as a mask.

In the Deep-RIE, through a Bosch process where etching and side wall protection are alternately performed, etching with an $SF_6$ gas and side wall protection with a $C_4F_8$ gas are performed. These conditions can be adopted also in any later Deep-RIE for the silicon layers.

Through this etching, shapes of respective the constituent elements, e.g., the first movable section 5, the second movable section 6, the electrode combteeth, the hinges, and the isolation trenches 14, are formed. In order to electrically isolate the first conductive portion 6a and the second conductive portion 6b, the device layer 3 is completely removed in the region of the isolation trenches 14 until the insulating layer 2 is exposed. The width of the isolation trenches 14 is e.g. 1 to 10 µm, but is not limited thereto.

After the resist pattern 31 is removed, there are formed: an oxide film pattern 32 for masking a region under the handle layer 4 (rear face of the wafer) in which to form the stationary section 13; and a resist pattern 33 for masking regions in which to form the stationary section 13 and the backlining 15.

Figure 6D:
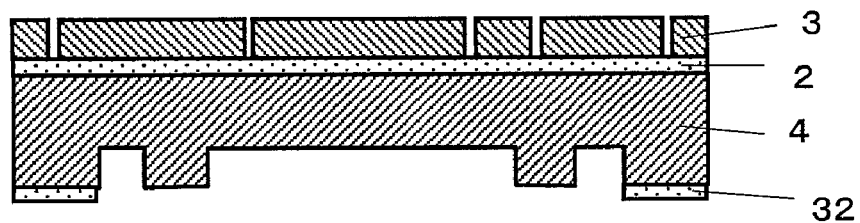
[FIG. 6D] A cross-sectional view showing a production step of a resonant mirror device according to an embodiment of the present invention.

Next, with reference to FIG. 6D, a silicon etching is performed under the handle layer 4, about to a depth that corresponds to a thickness of the handle layer 4 to be left as the backlining 15. Thereafter, the resist pattern 33 is removed.

Figure 6E:
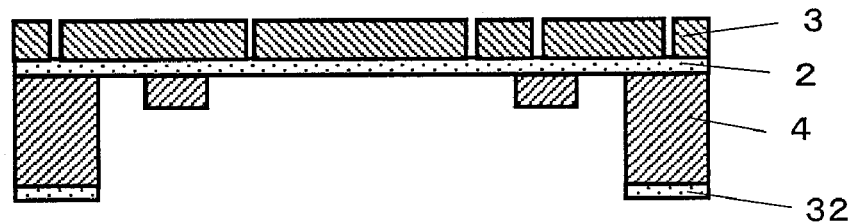
[FIG. 6E] A cross-sectional view showing a production step of a resonant mirror device according to an embodiment of the present invention.
Figure 6F:
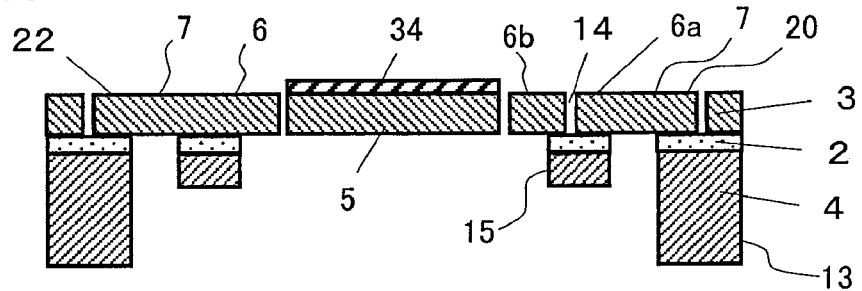
[FIG. 6F] A cross-sectional view showing a production step of a resonant mirror device according to an embodiment of the present invention.

Next, with reference to FIG. 6E, a silicon etching is performed under the handle layer 4 until the insulating layer 2 is exposed in any region other than the regions in which the stationary section 13 and the backlining 15 are to be formed, whereby the stationary section 13 and the backlining 15 are formed. Since a slight overetching is to be performed so that the etching will surely reach the insulating layer 2, the etching depth which has been described with reference to FIG. 6D is to be set by taking the overetching into account.

The thickness of the backlining 15 is designed so as to take into account the necessary strength, resonant frequencies of the movable sections, necessary amplitudes responsive to a driving voltage, and the like. The thickness of the backlining 15 is e.g. 30 to 100 µm, but is not limited thereto. Herein, it is assumed that the thickness is 50 µm. In order to electrically isolate the first conductive portion 6a and the second conductive portion 6b, the portions of the backlining 15 which are in contact with the first and second conductive portions 6a and 6b must have an insulation ability. In this example, the insulating layer portion of the backlining 15 is in contact with the first and second conductive portions 6a and 6b, as a result of which the first conductive portion 6a and the second conductive portion 6b are kept in an electrically isolated state.

Next, with reference to FIG. 6F, aluminum, gold, or silver of a thickness of 50 nm is vapor-deposited on the surface of the first movable section 5 as the reflection film 34. The material of the reflection film 34 is appropriately selected in view of the wavelength of the light to be used and the necessary reflectance.

Finally, the exposed portions of the insulating layer 2 and the oxide film pattern 32 are removed, thus releasing the first and second movable sections 5 and 6.

Thus, formation of the backlining 15 is performed merely by, when etching away the handle layer 4 on the rear face of the movable sections, adding a resist mask having the shape of the backlining 15 to effect a two-step etching. Thus, the backlining 15 can be formed without complicating the process.

Next, the functions and effects of the auxiliary electrode combteeth will be described.

In general, the relationship between a driving force F and a displacement x of an electrostatic actuator is determined by a capacitance C and a voltage V between electrodes. The capacitance C is determined by an opposing area S between electrodes opposing each other via a gap g. Given a dielectric constant $\in_0$, the capacitance C is expressed as: $C(x)=\in_0 S/g$. The driving force F is expressed as follows.

$$F = \frac{\partial}{\partial x}\left(\frac{1}{2}C(x)V^2\right) \qquad [\text{eq. 1}]$$

Figure 7:
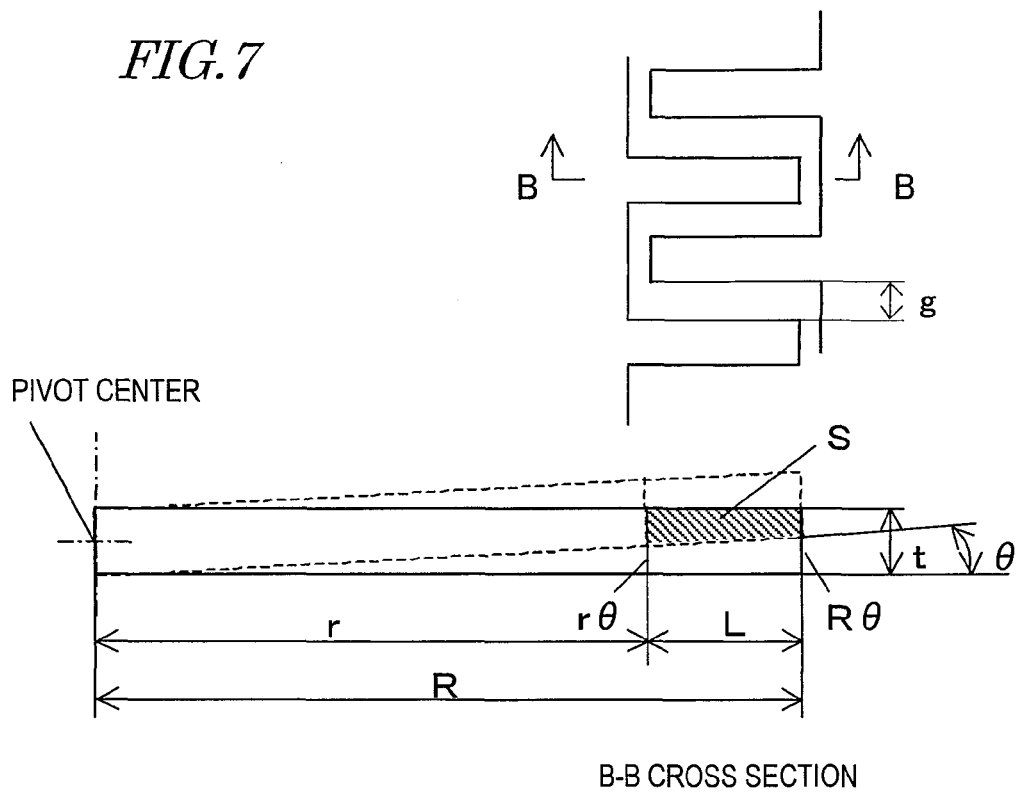
[FIG. 7] A cross-sectional view showing an opposing area between electrode combteeth of a resonant mirror device according to an embodiment of the present invention.

FIG. 7 is a cross-sectional view showing an opposing area between electrode combteeth of the resonant mirror device 1. The cross-sectional view shown in FIG. 7 corresponds to a B-B cross section in an upper plan view shown thereabove.

With reference to FIG. 7, when electrode combteeth having a length L and a thickness t are provided at a distance r from the pivot center, an electrode area S which opposes via a gap g is expressed as:

$$Smain = 2Nmain(t \cdot L - L(r+R)\theta/2)$$
$$= 2Nmain \cdot L(t - (r+R)\theta/2),$$

given a pivot angle θ and a number Nmain of combteeth.

Figure 8:
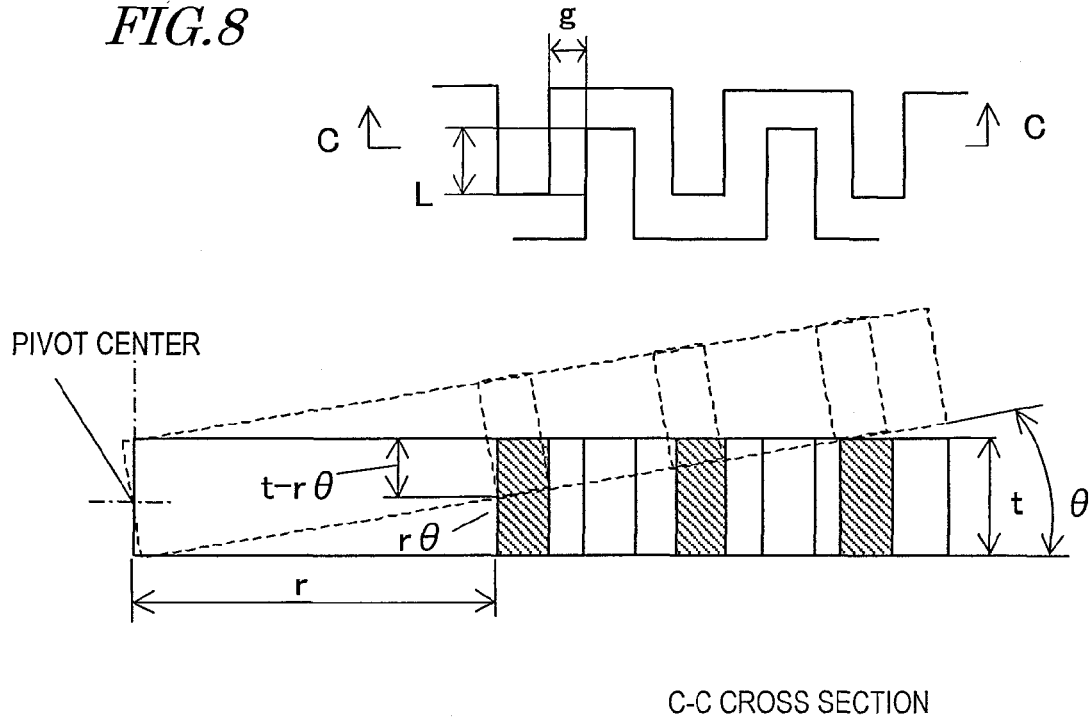
[FIG. 8] A cross-sectional view showing an opposing area between auxiliary electrode combteeth of a resonant mirror device according to an embodiment of the present invention.

FIG. 8 is a cross-sectional view showing an opposing area between auxiliary electrode combteeth of the resonant mirror device 1. The cross-sectional view shown in FIG. 8 corresponds to a C-C cross section in an upper plan view shown thereabove.

With reference to FIG. 8, an opposing area S' of an electrode which is at a distance r from the pivot center is expressed as:

$$S'=L(t-r\theta).$$

When all auxiliary electrode combteeth are totaled, the auxiliary electrode combteeth have an opposing area Sside as follows.

$$Sside=\Sigma S' \qquad [eq. 2]$$

Figure 9:
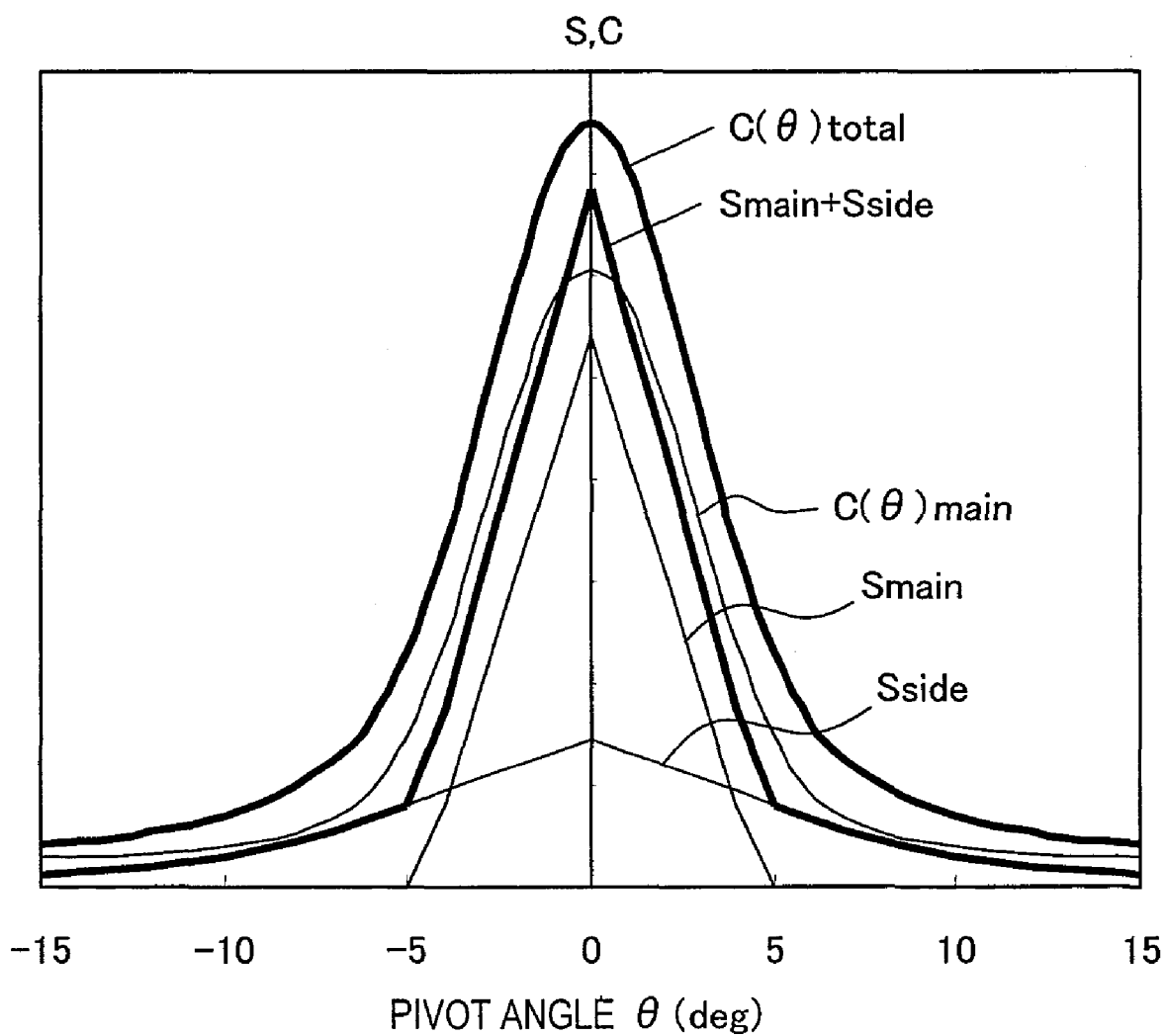
[FIG. 9] A graph showing opposing area between electrodes and change in capacitance of a resonant mirror device according to an embodiment of the present invention.
Figure 10:
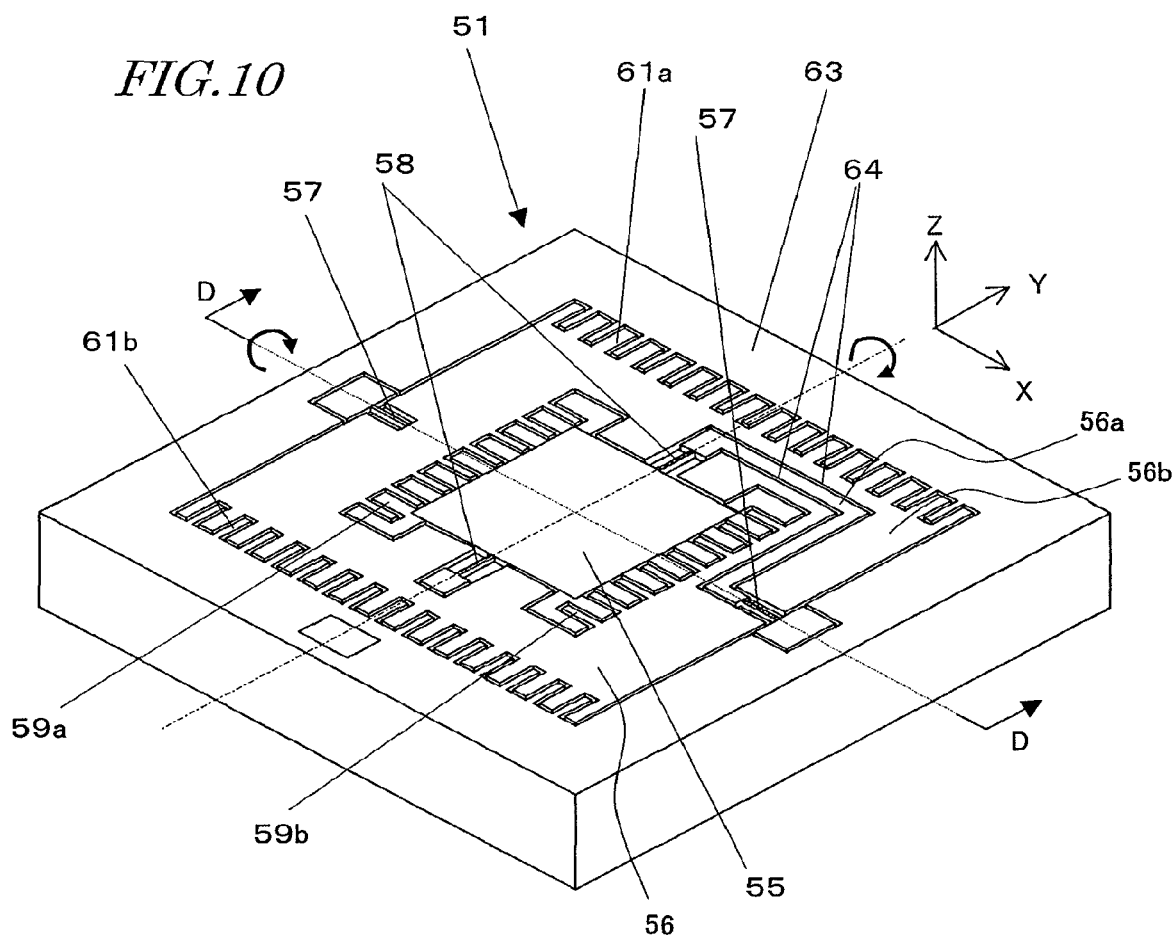
[FIG. 10] A perspective view showing a bi-axial pivoting type resonant mirror device.
Figure 11:
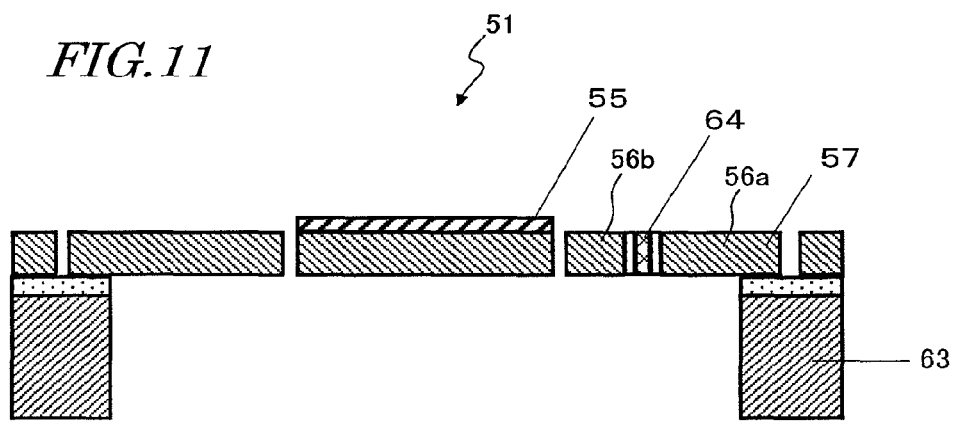
[FIG. 11] A cross-sectional view showing a bi-axial pivoting type resonant mirror device.
Figure 12:
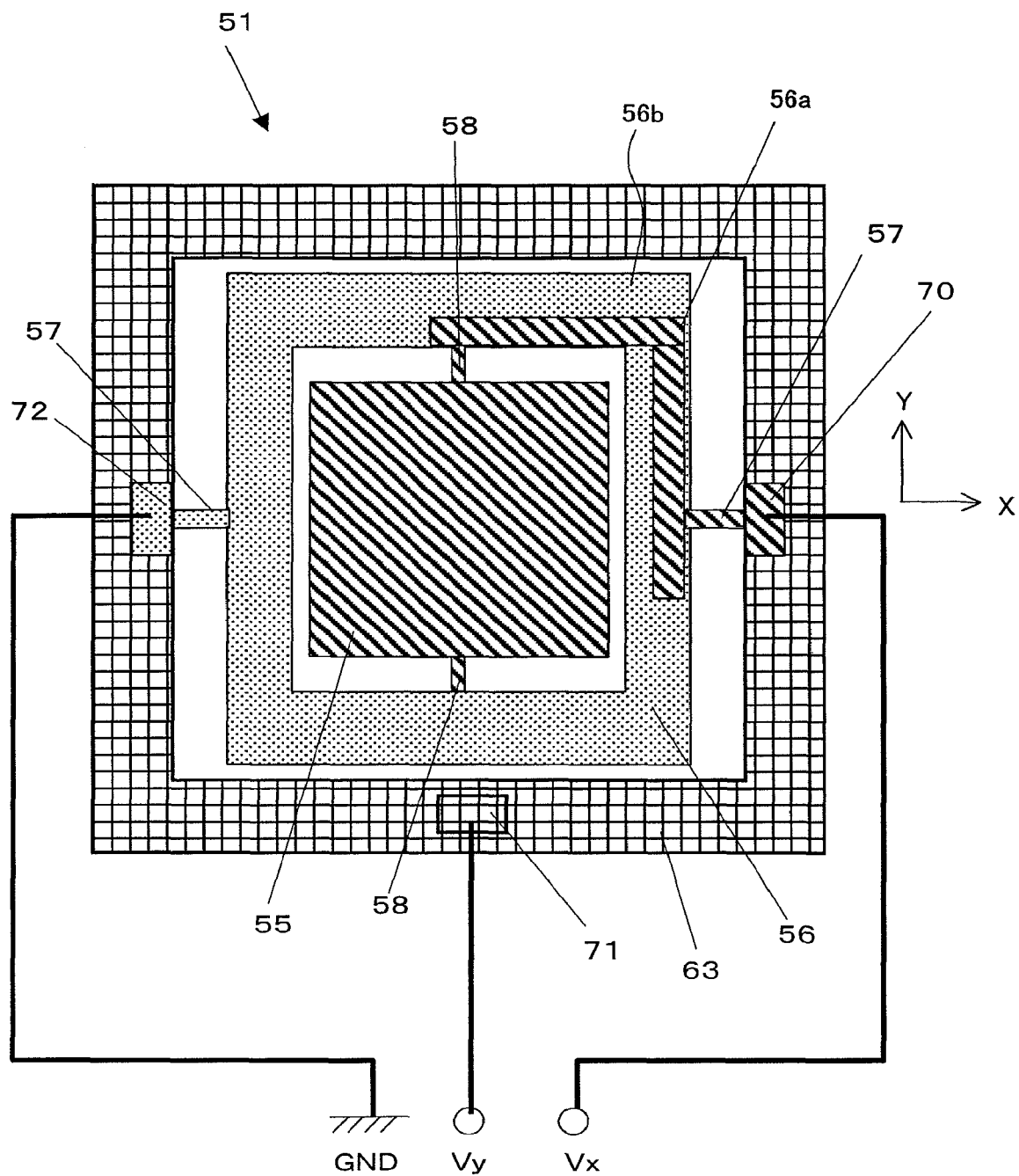
[FIG. 12] A plan view showing an electrical isolation scheme in a bi-axial pivoting type resonant mirror device.

FIG. 9 is a graph showing opposing area between electrodes and change in capacitance of the resonant mirror device 1.

With reference to FIG. 9, Smain exhibits non-zero values in a range where the electrode combteeth overlap one another, but is zero outside the range. On the other hand, as for change in capacitance $C(\theta)$, in actuality, small capacitances would occur also in portions other than the opposing faces of the combteeth (e.g., at tips of combteeth and at edges lacking combteeth). Therefore, the distribution of $C(\theta)$main presents a gentle curve in which Smain is contained.

In the example shown in FIG. 9, in the case where the mirror section has a pivot angle of ±15°, given that the mirror section has a length r of 0.5 mm and a thickness of 50 μm, approximately ±5° is the range of overlap.

On the other hand, Sside has a small peak value because of there being fewer combteeth, but, because of being located near the pivot center, makes an overlap in a broader range of pivot angles than do the main electrode combteeth, thus resulting in a broad angular range of non-zero values. Therefore, their sum, Smain+Sside, has non-zero values across the entire pivoting range, and $C(\theta)$total is increased over $C(\theta)$ main even with respect to values in the regions with large pivot angles. Thus, the auxiliary electrode combteeth have an effect of providing an increased capacitance in the region of large pivot angles, as compared to the case where there are only the main electrode combteeth.

When the capacitance is increased because of the auxiliary electrode combteeth, the driving force is also increased accordingly.

Moreover, when detecting a pivot angle of the mirror section by detecting capacitance, change in capacitance can be surely detected even with respect to large pivot angles such that overlap between main electrode combteeth is lost. Thus, by allowing the pivot angle of the mirror section to be fed back to the driving signal, a surer resonance driving can be performed.

INDUSTRIAL APPLICABILITY

The present invention is particularly useful in technological fields where a direction of light travel is changed by using a mirror device. For example, it is useful for optical scanning apparatuses for use in laser printers and the like, reading apparatuses such as bar-code readers, laser projectors, and so on.

The invention claimed is:

1. An actuator comprising:
a first movable section including a mirror section for reflecting light;
a second movable section supporting the first movable section; and
a stationary section supporting the second movable section, wherein,
the second movable section includes:
a first conductive portion for applying a first voltage to the first movable section;
a second conductive portion to which a second voltage is applied; and
backlining for stabilizing the first conductive portion and the second conductive portion to each other from a face of the actuator opposite from a face on which the mirror section is provided,
wherein an isolation trench is formed in the second movable section,
the first conductive portion and the second conductive portion are electrically insulated from each other by the isolation trench,
a dummy trench is formed in the second movable section, and
at least a portion of the dummy trench is formed at a point symmetric position with respect to a center of the second movable section from the isolation trench in the second movable section.

2. The actuator of claim 1, wherein,
the first and second movable sections are formed by, in an SOI wafer in which first and second silicon layers are bonded via an insulating layer, etching the first silicon layer; and
the backlining is formed by etching the second silicon layer.

3. The actuator of claim 1, wherein,
the first movable section includes first and second electrode combteeth for generating a driving force for causing a relative displacement of the first movable section with respect to the second movable section;
the first electrode combteeth extend in a direction which is perpendicular to a pivot axis of the first movable section;
the second electrode combteeth extend in a direction which is parallel to the pivot axis of the first movable section;
the second movable section includes third and fourth electrode combteeth for generating a driving force for causing a relative displacement of the second movable section with respect to the stationary section;
the third electrode combteeth extend in a direction which is perpendicular to a pivot axis of the second movable section; and
the fourth electrode combteeth extend in a direction which is parallel to the pivot axis of the second movable section.

4. A production method for the actuator of claim 1,
the production method comprising:
a step of forming the first and second movable sections by, in an SOI wafer in which first and second silicon layers are bonded via an insulating layer, etching the first silicon layer; and
a step of forming the backlining by etching the second silicon layer.

5. The production method of claim 4, wherein the step of forming the backlining includes:
a step of forming a resist pattern that masks a position on the second silicon layer at which to form the backlining;
a step of etching the second silicon layer to a depth corresponding to a thickness of the second silicon layer to be left as the backlining;
a step of removing the resist pattern, and etching the second silicon layer until the insulating layer is exposed in a position other than the position at which to form the backlining; and
a step of removing a exposed portion of the insulating layer.

6. The actuator of claim 3, wherein a second dummy trench is formed in the second movable section, and
at least a portion of the second dummy trench is formed at a axisymmetric position with respect to the pivot axis of the first movable section from the isolation trench in the second movable section.

* * * * *